United States Patent [19]
Holtzman

[11] Patent Number: 6,067,080

[45] Date of Patent: May 23, 2000

[54] RETROFITTABLE APPARATUS FOR CONVERTING A SUBSTANTIALLY PLANAR SURFACE INTO AN ELECTRONIC DATA CAPTURE DEVICE

[75] Inventor: Rafi Holtzman, San Mateo, Calif.

[73] Assignee: Electronics for Imaging, Foster City, Calif.

[21] Appl. No.: 08/804,491

[22] Filed: Feb. 21, 1997

[51] Int. Cl.[7] .................................................. G09G 5/00
[52] U.S. Cl. .......................... 345/173; 345/179; 341/5; 178/18.09; 178/19.01
[58] Field of Search ..................... 345/173, 177, 345/179; 178/18.09, 18.07, 18.11, 18.04, 18.02, 19.05, 19.01, 19.02, 19.03, 19.07; 341/5, 137; 367/101

[56] References Cited

U.S. PATENT DOCUMENTS

| | | | |
|---|---|---|---|
| Re. 33,936 | 5/1992 | Miyamori et al. ........................ | 178/18 |
| 3,134,099 | 5/1964 | Woo . | |
| 3,382,480 | 5/1968 | Tsao et al. . | |
| 3,396,366 | 8/1968 | Midlock et al. . | |
| 3,613,066 | 10/1971 | Cacreman ............................... | 340/347 |
| 3,706,850 | 12/1972 | Fisher et al. ............................. | 178/18 |
| 3,731,273 | 5/1973 | Hunt ........................................ | 340/16 |
| 3,838,212 | 9/1974 | Whetstone et al. ..................... | 179/18 |
| 3,914,754 | 10/1975 | Kirk ........................................ | 340/267 |
| 4,012,588 | 3/1977 | Davis et al. ............................ | 178/18 |
| 4,103,278 | 7/1978 | Satake et al. ........................... | 340/1 R |
| 4,246,439 | 1/1981 | Roemein ................................ | 178/18 |
| 4,307,456 | 12/1981 | Ise et al. ................................. | 367/900 |
| 4,309,098 | 1/1982 | Shenk .................................... | 354/25 |
| 4,317,005 | 2/1982 | de Bruyne ............................. | 178/19 |
| 4,336,987 | 6/1982 | Shenk .................................... | 354/195 |
| 4,357,672 | 11/1982 | Howells et al. ........................ | 364/561 |
| 4,439,846 | 3/1984 | Rodriguez ............................. | 367/99 |
| 4,440,482 | 4/1984 | Shenk .................................... | 354/195.1 |
| 4,488,000 | 12/1984 | Glenn .................................... | 178/18 |
| 4,490,814 | 12/1984 | Shenk .................................... | 367/140 |
| 4,506,354 | 3/1985 | Hansen .................................. | 367/101 |
| 4,550,250 | 10/1985 | Mueller et al. ........................ | 178/18.09 |

(List continued on next page.)

FOREIGN PATENT DOCUMENTS

| | | | |
|---|---|---|---|
| 0 229 637A2 | 7/1987 | European Pat. Off. ........ | G06K 11/06 |
| 0 307 893A2 | 3/1989 | European Pat. Off. ........ | G06K 11/06 |
| 0 600 576A1 | 6/1994 | European Pat. Off. ........ | G06K 11/06 |
| 0 655 674A2 | 5/1995 | European Pat. Off. ........ | G06F 3/033 |
| WO 98/37508 | 8/1998 | WIPO . | |
| WO 98/38595 | 9/1998 | WIPO . | |
| WO 98/38596 | 9/1998 | WIPO . | |
| WO 98/39729 | 9/1998 | WIPO . | |
| WO 98/40838 | 9/1998 | WIPO . | |

OTHER PUBLICATIONS

"Radar On A Chip," Popular Science, Mar. 1996.

"Micropower Impulse Radar (MIR) Technology Overview," htt;://lasers.llnl.gov/lasers/idp/mir/files/MIR_info.ht (1996).

advertisement by Wacom, 1996.

advertisement by Calcomp , 1996.

*Primary Examiner*—Daniel J. Wu
*Assistant Examiner*—John Twell, Jr.
*Attorney, Agent, or Firm*—Michael A. Glenn

[57] ABSTRACT

A graphic data-acquisition system which employs an active tracking system provides a retrofittable apparatus for converting a substantially planar surface into an electronic data capture device, in which the components of the system are readily retrofittable, at relatively low cost, to a wide variety of otherwise conventional writing-surface structures, such as so-called dry-erase whiteboards. Conventional triangulation techniques are used to track the position and motion of a writer or eraser. An encoding facility associated with the writing implement provides the ability to distinguish whether the writing implement is used for marking or as an erasing implement, as well as determining the nature or character of written line width or eraser swath. A data stream thus generated can be used in a variety of ways, such as for example, to feed information into the memory of a digital computer, and/or to feed information for transmission to remote stations.

16 Claims, 5 Drawing Sheets

U.S. PATENT DOCUMENTS

| | | | |
|---|---|---|---|
| 4,552,991 | 11/1985 | Hulls | 178/19 |
| 4,564,928 | 1/1986 | Glenn et al. | 367/117 |
| 4,568,182 | 2/1986 | Modjallal | 178/18.09 |
| 4,570,033 | 2/1986 | Hulls | 178/19 |
| 4,578,674 | 3/1986 | Baker et al. | 340/710 |
| 4,654,648 | 3/1987 | Herrington et al. | 340/710 |
| 4,665,282 | 5/1987 | Sato et al. | 178/18 |
| 4,670,751 | 6/1987 | Enokido et al. | 340/706 |
| 4,677,595 | 6/1987 | Obayashi et al. | 367/13 |
| 4,682,159 | 7/1987 | Davison | 340/709 |
| 4,688,933 | 8/1987 | Lapeyre | 345/173 |
| 4,695,833 | 9/1987 | Ogura et al. | 340/722 |
| 4,711,977 | 12/1987 | Miyamori et al. | 178/18 |
| 4,729,108 | 3/1988 | Uchiyama | 178/20.04 |
| 4,739,860 | 4/1988 | Kobayashi et al. | 181/123 |
| 4,750,584 | 6/1988 | Tanaka et al. | 181/123 |
| 4,758,691 | 7/1988 | de Bruyne | 178/19 |
| 4,772,764 | 9/1988 | Dorr | 178/18 |
| 4,777,329 | 10/1988 | Mallicoat | 178/18 |
| 4,782,328 | 11/1988 | Denlinger | 341/5 |
| 4,796,726 | 1/1989 | Kobayashi | 181/123 |
| 4,814,552 | 3/1989 | Stefik et al. | 178/18 |
| 4,827,410 | 5/1989 | Corren | 364/200 |
| 4,829,492 | 5/1989 | Choi et al. | 367/110 |
| 4,845,684 | 7/1989 | Garwin et al. | 367/137 |
| 4,853,715 | 8/1989 | Paschkis | 346/139 |
| 4,862,152 | 8/1989 | Milner | 340/712 |
| 4,963,703 | 10/1990 | Phillips et al. | 178/19 |
| 4,988,981 | 1/1991 | Zimmerman et al. | 340/709 |
| 4,991,148 | 2/1991 | Gilchrist | 367/124 |
| 5,017,913 | 5/1991 | Kaneko et al. | 340/712 |
| 5,023,408 | 6/1991 | Murakami et al. | 178/19 |
| 5,043,950 | 8/1991 | Schorum et al. | 367/98 |
| 5,050,134 | 9/1991 | Butler | 367/118 |
| 5,107,746 | 4/1992 | Bauer | 84/626 |
| 5,134,388 | 7/1992 | Murakami et al. | 345/173 |
| 5,142,506 | 8/1992 | Edwards | 367/127 |
| 5,144,594 | 9/1992 | Gilchrist | 367/129 |
| 5,166,668 | 11/1992 | Aoyagi | 345/183 |
| 5,182,585 | 1/1993 | Stoner | 351/41 |
| 5,214,615 | 5/1993 | Bauer | 367/128 |
| 5,226,320 | 7/1993 | Dages et al. | 73/290 |
| 5,229,975 | 7/1993 | Truesdell et al. | 367/107 |
| 5,231,381 | 7/1993 | Duwaer | 340/712 |
| 5,239,139 | 8/1993 | Zuta | 178/18 |
| 5,248,856 | 9/1993 | Mallicoat | 178/18 |
| 5,280,457 | 1/1994 | Figuero et al. | 367/127 |
| 5,308,936 | 5/1994 | Biggs et al. | 178/18 |
| 5,379,269 | 1/1995 | Sindeband et al. | 367/127 |
| 5,434,370 | 7/1995 | Wilson et al. | 178/18 |
| 5,448,263 | 9/1995 | Martia | 345/173 |
| 5,451,724 | 9/1995 | Nakazawa et al. | 345/173 |
| 5,500,492 | 3/1996 | Kobayashi et al. | 178/18 |
| 5,534,671 | 7/1996 | Gierut et al. | 178/19.01 |
| 5,557,301 | 9/1996 | D'Aviau de Piolant | 345/179 |
| 5,571,997 | 11/1996 | Gray et al. | 345/173 |
| 5,583,323 | 12/1996 | Zurstadt et al. | 345/179 |
| 5,691,959 | 11/1997 | Kriewall et al. | 367/129 |
| 5,866,856 | 2/1999 | Holtzman | 178/19.01 |

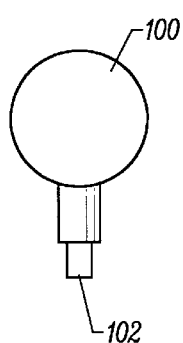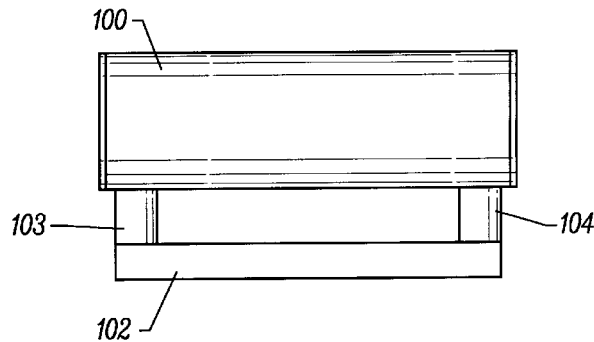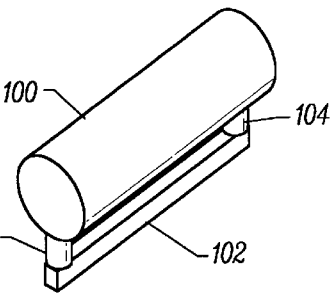
FIG. 9a  FIG. 9b  FIG. 9c
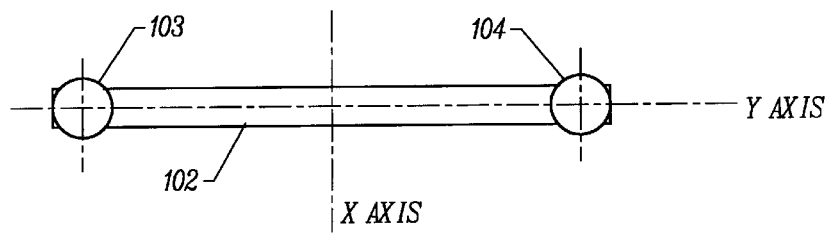
FIG. 10
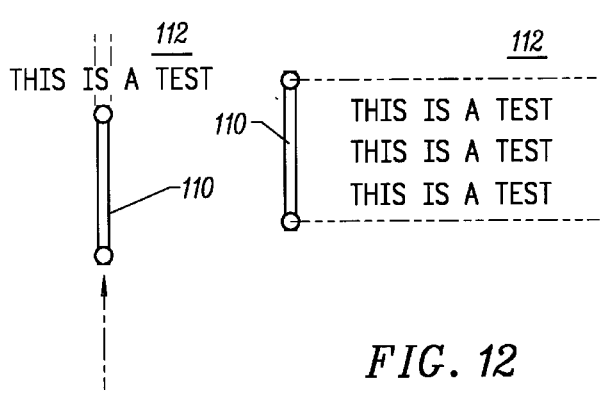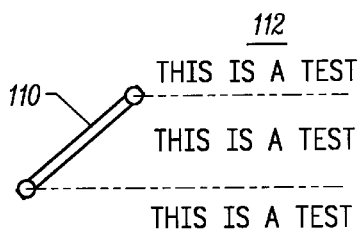
FIG. 11  FIG. 12  FIG. 13

RETROFITTABLE APPARATUS FOR CONVERTING A SUBSTANTIALLY PLANAR SURFACE INTO AN ELECTRONIC DATA CAPTURE DEVICE

BACKGROUND OF THE INVENTION

1. Technical Field

The invention relates to electronic data capture devices. More particularly, the invention relates to a retrofittable apparatus for converting a substantially planar surface into an electronic data capture device.

2. Description of the Prior Art

Electronic blackboards date at least to the mid-1960s, at which time emphasis was placed on the communication of graphical data, specifically handwriting and sketches, from one location to another. U.S. Pat. No. 3,706,850 discloses a system related to such activity.

At about the same time, graphic tablets that allowed the entry of line drawings into a computer were developed. U.S. Pat. No. 3,838,212 is an early example of developments in this area.

By the mid-1980s, a third kind of a product group was developed to address the need for a local hard copy of material written and sketched onto a dry-erase, so-called whiteboard. This generic group of systems, known collectively as electronic copyboards (ECBs), relates fundamentally to stand-alone devices that have much in common with well known reducing photocopiers.

Each of these devices attempts to provide the user with a natural communication metaphor that uses familiar writing tools. In the case of electronic blackboards and electronic copyboards, the metaphor is a fixed wall-mounted surface meant for mass viewing, in which marking or writing is accomplished by the use of colored markers, and in which erasing is accomplished by wiping the surface with an eraser. In the case of the graphic tablet, the metaphor is a desktop slate and stylus meant for individual use.

Those skilled in the art recognize that both electronic blackboards and electronic copyboards typically require dedicated, highly specialized surfaces and equipment structures. These specialized structures result in an immobile, cumbersome, and relatively expensive system. Systems and approaches generally in this line of technical art are illustrated, for example, in U.S. Pat. No. 3,613,066 to Cecreman, U.S. Pat. No. 4,558,313 to Garwin et al., U.S. Pat. No. 4,506,354 to Hansen, U.S. Pat. No. 4,670,751 to Enokido, U.S. Pat. No. 4,711,977 (U.S. Pat. No. Re. 33,936) to Miyamori, U.S. Pat. No. 4,777,329 to Mallicoat, U.S. Pat. No. 4,814,552 to Stefik et al., U.S. Pat. No. 5,248,856 to Mallicoat, U.S. Pat. No. 5,023,408 to Murakami, and U.S. Pat. No. 5,434,370 to Wilson.

The '066 patent discloses a display panel and means responsive to the positions and moves of a pointer on the panel to generate information signals for a computer. Thin, coherent light beams parallel to the surface of the panel a systematically and repetitively displaced in crossing relation to scan at least part of the surface. The position of a marker relative to the display panel is detected by interference of the marker with the scanned light beams.

The '313 patent focuses on an indicator-to-data processing interface which employs a light source and a background reflector as constituents in a system to monitor occlusion of light occurring from the positioning and movement of a manually moved indicator over a surface.

The '751 patent discloses an eraser for an electronic blackboard having a variable erasing area. The eraser includes a small area erasing unit and a detachable large area erasing unit. Detectors determine when the eraser is touched to the surface of the board, as well as whether the small area erasing unit or the large area erasing unit are currently in use.

The '977 patent discloses an electronic blackboard, writing instrument, and position-detecting control unit. The system uses magnetic bias to detect the position of a writing/erasing element relative to that of video information displayed on a writing surface.

The '329 and '856 patents address a graphic input system which employs ultrasound (the '329 patent) or scanned light (the '856 patent) to monitor the position of a mobile element over a surface. The '856 patent includes at least two spaced transceiver-structure stations that optically track the position and motion of a writer or eraser based upon bar code techniques. While it is suggested in the '856 patent that these transceiver-structure stations may be retrofitted to a conventional writing-surface structure, no discussion is provided for performing such retrofit, nor is it clear that the scanning technology disclosed would be suitable for a retrofit application, where the spaced, separate structures cannot be rendered insensitive to in-use relational changes (for example, movement and vibration of the white board occasioned by movement of the writing implement to and across the surface of the white board during use), and where adequate precision to effect an accurate scan cannot be achieved without regular calibration during use due to the relative positional instability of the multiple spaced sensors.

The '552 patent discloses an input device, or stylus, for entering hand drawn forms into a computer comprising a writing instrument, a pressure switch for determining whether the instrument is in contact with the writing surface, an acoustic transmitter for triangulating the position of the stylus on the surface, and a wireless transmitter for transmitting data and timing information to the computer. In operation, the stylus transmits an infrared signal which the system receives immediately, and an ultrasound pulse which two microphones receive after a delay which is a function of the speed of sound and the distance of the stylus from each microphone. From this information the system can calculate the position of the stylus. Switches for indicating functions are mounted on the stylus. Multiple styluses can be used, each transmitting a distinctive identification code so that the system can determine which stylus is the signal source.

The '408 patent describes an electronic blackboard, including a sensing tablet which senses the position of a writing tool that includes a tuned circuit having a predetermined resonant frequency.

The '370 patent discloses a graphic data acquisition system in which a digitized record is produced according to the X, Y, and Z position of a writing implement relative to a writing surface. An expanse of electromagnetic radiation is generated in a zone adjacent to the writing surface, and an electromagnetic interactive pen interacts with such electromagnetic radiation to produce a signal that locates the pen relative to the writing surface.

Prior art systems of the type outlined above are relatively complex, immobile, and costly. Typically, they are not readily retrofittable at all, much less to a wide variety of writing-surface structures which are already in hundreds of thousands of users' possessions. In fact, for useful and accurate operation, such systems depend upon a specific surface having either embedded sensors or otherwise precisely predetermined qualities. Further, prior art systems are not particularly adapted to yield information about the condition of a writing stylus or an eraser much beyond its position or station over a writing surface.

Accordingly, it would be advantageous to provide a novel graphic data-acquisition system which offers not only the various features and advantages made available by prior art, but which further effectively addresses the various performance, cost, simplicity, mobility and sophistication issues mentioned above. It would be especially advantageous to provide such a system that is readily retrofitted to existing writing surfaces without the need for special mounting arrangements or regular calibration, while providing a high degree of precision and stability, and while also providing a rich complement of sophisticated features.

SUMMARY OF THE INVENTION

The invention is a graphic data-acquisition system which employs a continuously active tracking system to provide a retrofittable apparatus for converting a substantially planar surface into an electronic data capture device. Various techniques are disclosed that allow the fabrication of a retrofittable assembly, such that any substantially planar surface may be converted into an electronic data capture device. Thus, the components of the system are readily retrofittable, at relatively low cost, to a wide variety of otherwise conventional writing-surface structures, such as so-called dry-erase whiteboards.

The invention employs any conventional triangulation technique to track the position and motion of a writer or eraser. As discussed above, many such techniques are known, but these techniques have traditionally required a specialized or dedicated writing surface or have been otherwise unsuited for retrofit to an existing writing surface. The invention exploits to advantage both the significant improvements in modern tracking technology and a novel and improved fitting technique that allows rapid and efficient retrofit of a tracking assembly to a dry-erase whiteboard or other planar surface, while providing a precision tracking system that accurately tracks a writing implement in three dimensions, thus capturing all marks placed on the marking surface.

Further, by using an encoding facility associated with a writing implement the invention provides the ability to distinguish whether the writing implement is used for marking or an as erasing implement, as well as determining the nature or character of written line width or eraser swath, for example specific color in the instance of a colored writing instrument. A data stream thus generated can be used in a variety of ways, such as for example, to feed information into the memory of a digital computer, and/or to feed information for transmission to remote stations for live presentation of writing activity occurring on the writing-surface area in the system.

BRIEF DESCRIPTION OF THE DRAWINGS

FIGS. 9a–9c provide an end view (FIG. 9a), a side view (FIG. 9b), and a perspective view (FIG. 9c) of a two-point or Squeegee-type eraser according to an alternative embodiment of the invention;

FIG. 10 provides an erasing edge view of a two-point or Squeegee-type eraser according to the invention;

FIG. 11 shows the use of the eraser of FIGS. 9a–9c and 10 to erase a thin area of a presentation board in a motion that is parallel to the Y axis of the eraser;

FIG. 12 shows the eraser of FIGS. 9a–9c and 10 in use to erase a wide area in a motion that is parallel to the X axis of the presentation board; and FIG. 13 shows the erasers of FIGS. 9a–9c and 10 being wiped in a diagonal motion to provide an erasing surface that is between a thin erasing swath shown on FIG. 11 and the wide erasing swath shown on FIG. 12 according to the invention.

DETAILED DESCRIPTION OF THE INVENTION

The invention is a graphic data-acquisition system which employs a continuously active tracking system to provide a retrofittable apparatus for converting a substantially planar surface into an electronic data capture device. Various techniques are disclosed that allow the fabrication of a retrofittable assembly, such that any substantially planar surface may be converted into an electronic data capture device. Thus, the components of the system are readily retrofittable, at relatively low cost, to a wide variety of otherwise conventional writing-surface structures, such as so-called dry-erase whiteboards.

The invention employs any conventional triangulation technique to track the position and motion of a writer or eraser. As discussed above, many such techniques are known, but these techniques have traditionally required a dedicated writing surface or have been otherwise unsuited for retrofit to an existing writing surface. The invention exploits to advantage both the significant improvements in modern tracking technology and a novel and improved fitting technique that allows rapid and efficient retrofit of a tracking assembly to a dry-erase whiteboard or other planar surface, while providing a precision tracking system that accurately tracks a writing implement in three dimensions, thus capturing all marks placed on the marking surface.

Further, by using an encoding facility associated with a writing implement the invention provides the ability to distinguish whether the writing implement is used for marking or as an erasing implement, as well as determining the nature or character of written line width or eraser swath, for example specific color in the instance of a colored writing instrument. A data stream thus generated can be used in a variety of ways, such as for example, to feed information into the memory of a digital computer, and/or to feed information for transmission to remote stations for live presentation of writing activity occurring on the writing-surface area in the system.

Figure 1:
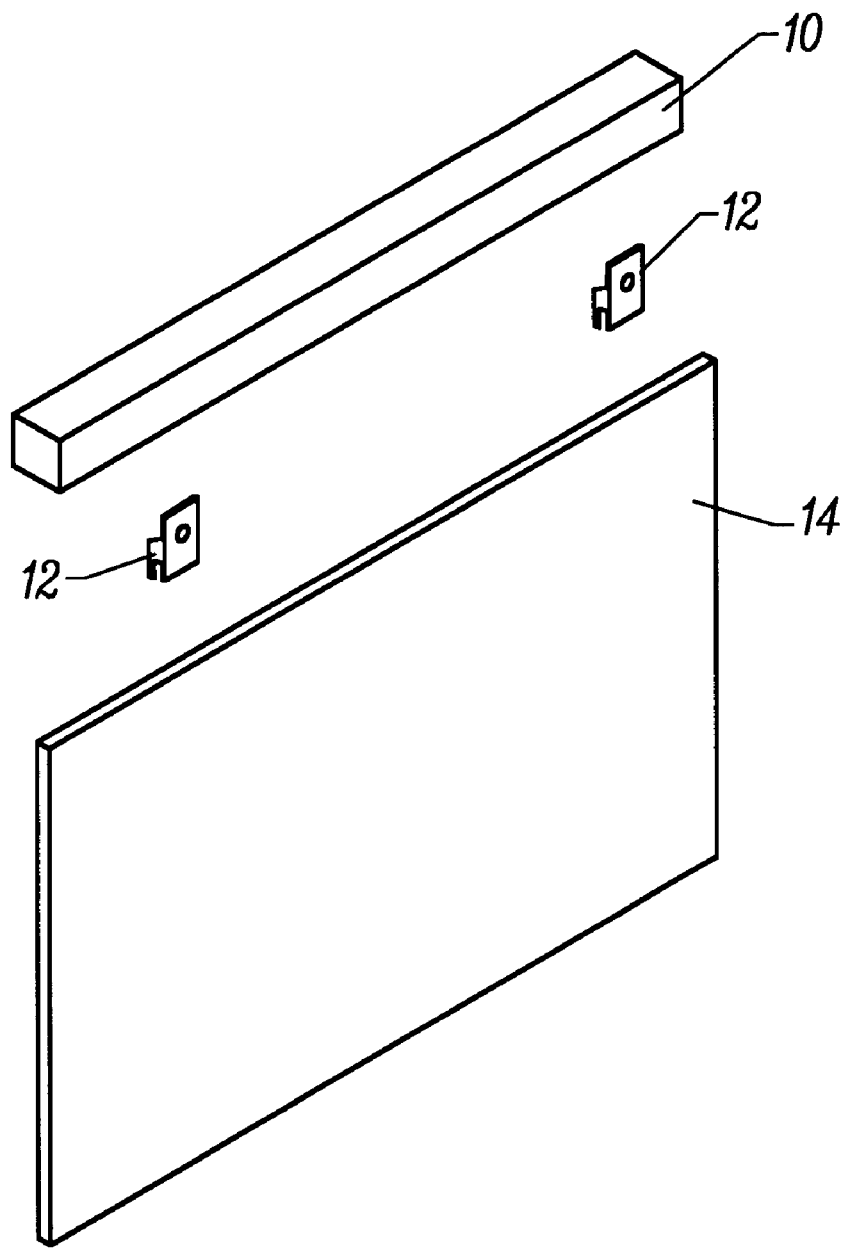
FIG. 1 is an exploded perspective view of a retrofittable apparatus for converting a substantially planar surface into an electronic data capture device according to the invention.

FIG. 1 is an exploded perspective view of a retrofittable apparatus for converting a substantially planar surface into an electronic data capture device according to the invention. On FIG. 1, a writing surface 14 is shown having a sensor array 10 attached thereto by an attachment method 12. The writing surface may be any substantially planar surface, including for example a whiteboard or blackboard, a table, a video display, a wall, a bulletin board, or a floor. The sensor array may be any conventional position sensing device, as is discussed above in connection with the prior art, or as is more fully discussed below in connection with MIR devices.

The attachment method may be any technique or device that affixes the sensor array to the writing surface. While this retrofittability arrangement may initially appear trivial, it is not, in light of the difficulty of attaining accurate tracking of a marking implement to capture position information that may be converted to a precision representation of text and drawings. In this regard, the prior art has almost unanimously taught and relied on the use of a dedicated, specialized writing surface to assure accurate positioning of the various sensors used to capture writing implement positional information. This was necessary because the position sensing devices required accurate calibration to detect minute variations in waveforms or light patterns. In such environment, both cumulative errors, and vibrations and movements attributable to motion of the writing surface during repeated movement of a marker across the board surface tend to produce unacceptable (and often unintelligible) results.

Thus, a key aspect of the invention involves the provision of a unitary sensor array that securely and rigidly fixes the relation between the various sensors within the array itself, such that the unitary array assembly may be repeatedly removed and affixed to any substantially planar surface and yet still provide the high degree of precision and accuracy necessary to effect a high quality capture of text and drawings. This arrangement is particularly critical in a system that employs an active writing implement, where such implement produces signals having various patterns or frequencies which indicate different functions, such as pen width or eraser operation, as well as different colors; and further where the act of marking upon the writing surface produces vibrations and movement of the writing surface which may result in inaccuracies due to variations in transmission times or movements in the board surface.

Figure 2:
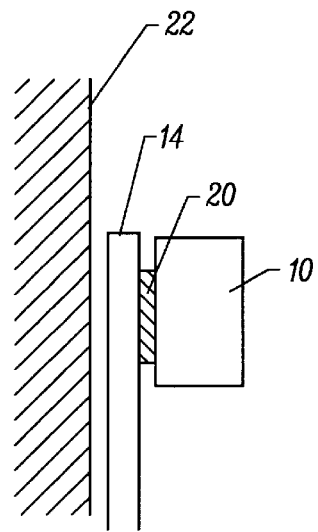
FIG. 2 is a partially sectioned, side view of a sensor array attachment method according to a first preferred embodiment of the invention.

FIG. 2 is a partially sectioned, side view of a unitary mobile sensor array attachment method according to a first preferred embodiment of the invention. In this embodiment of the invention the writing surface 14 is secured to a wall 22 using conventional methods. The sensor array 10 is affixed to the writing surface using an attachment method 20 that may comprise a double stick mounting tape or a temporary fastener, such as Velcro fastener. This attachment method is particularly well suited for such surfaces as video displays, although it is also well suited for various other applications.

Figure 3:
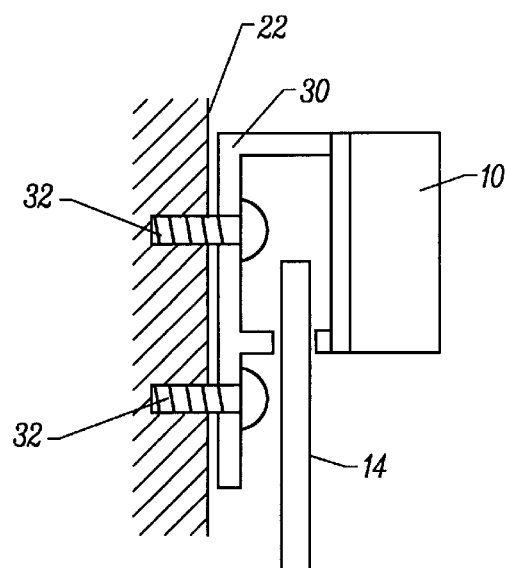
FIG. 3 is a partially sectioned, side view of a sensor array attachment method according to a second, equally preferred embodiment of the invention.

FIG. 3 is a partially sectioned, side view of a mobile unitary sensor array attachment method according to a second, equally preferred embodiment of the invention. In this embodiment of the invention, the sensor array 10 may be mounted to a wall 22 by a bracket 30. The bracket itself is secured to the wall with a fastener 32, such as a bolt or toggle. The writing surface 14 may be secured to the wall by the same bracket, or it may be separately secured to the wall.

Figure 4:
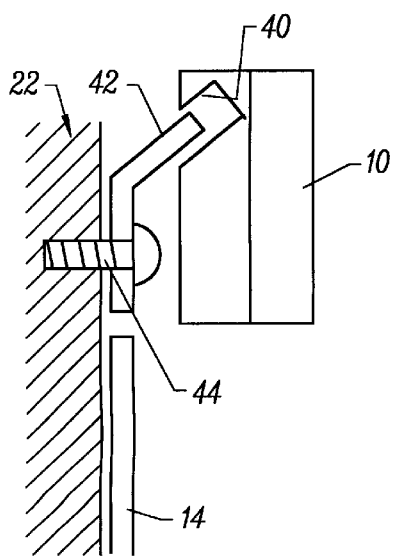
FIG. 4 is a partially sectioned, side view of a sensor array attachment method according to a third, equally preferred embodiment of the invention.

FIG. 4 is a partially sectioned, side view of a mobile unitary sensor array attachment method according to a third, equally preferred embodiment of the invention. In this embodiment of the invention, the writing surface 14 is secured to a wall 22 using conventional techniques. A bracket 42 having a portion that projects from the wall at an acute, upward angle, is secured to the wall by a fastener 44, such as a bolt or a toggle. The sensor array 10 is affixed to the bracket by a second bracket 40 associated therewith that has a complementary channel that is adapted to engage with the projecting portion of the wall mounted bracket in a secure fashion.

Figure 5:
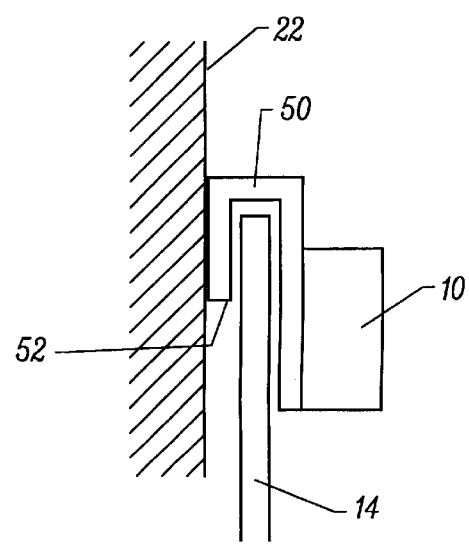
FIG. 5 is a partially sectioned, side view of a sensor array attachment method according to a fourth, equally preferred embodiment of the invention.

FIG. 5 is a partially sectioned, side view of a mobile unitary sensor array attachment method according to a fourth, equally preferred embodiment of the invention. In this embodiment of the invention, the writing surface 14 is secured to the wall 22 using conventional techniques. The sensor array 10 is affixed to a clip-on bracket 50 that includes a U-shaped portion 52 which is adapted to engage with an upper edge of the writing surface, for example with the upper edge of a whiteboard. This embodiment of the invention presumes that there is at least of modicum of clearance between the wall and the writing surface to accommodate the U-shaped portion of the clip-on bracket.

Figure 6:
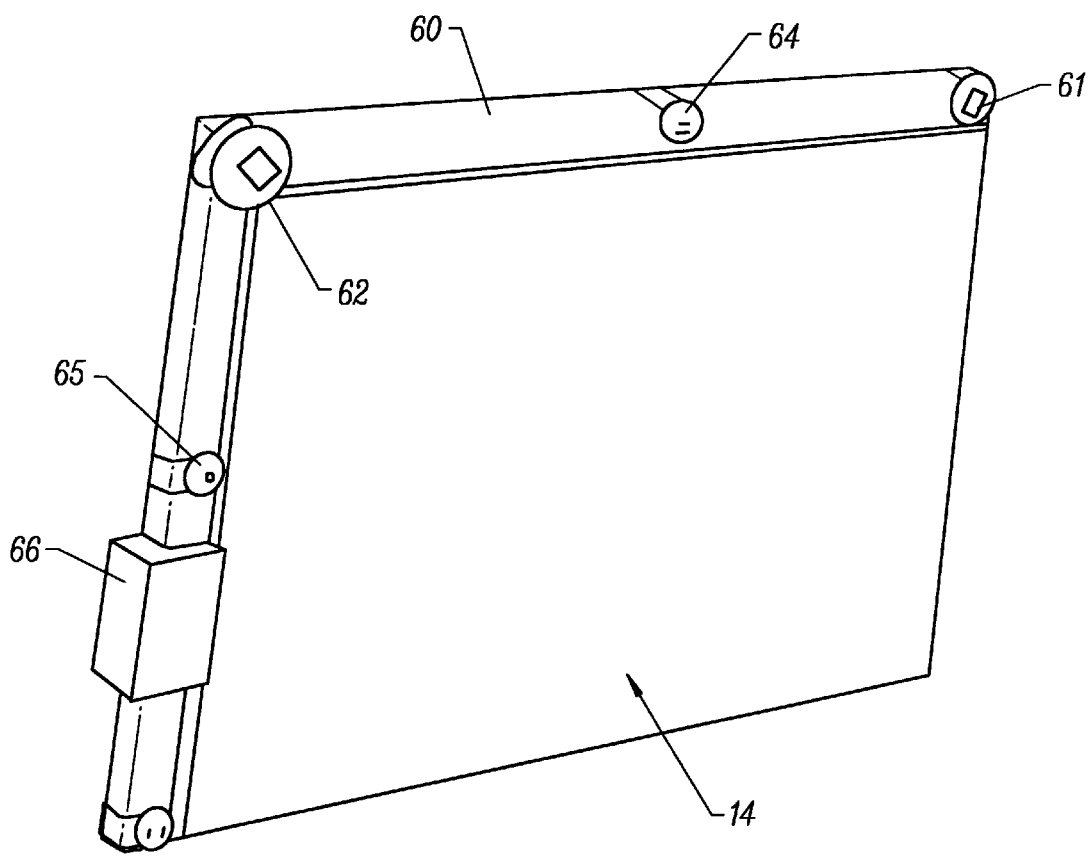
FIG. 6 is a perspective view of an L-shaped sensor array according to the invention.

FIG. 6 is a perspective view of a mobile unitary L-shaped sensor array according to the invention. In this embodiment of the invention, the sensor array is formed in an L-shaped configuration to allow three intersecting sensor paths 61, 62, 63. Additional sensors 64, 65 may also be provided. This configuration provides a high degree of accuracy by allowing precise triangulation of writing implement position. Various components associated with the sensor assembly are positioned in a module 66 that is mounted to the sensor array.

Figures 7A, 7B, 7C:
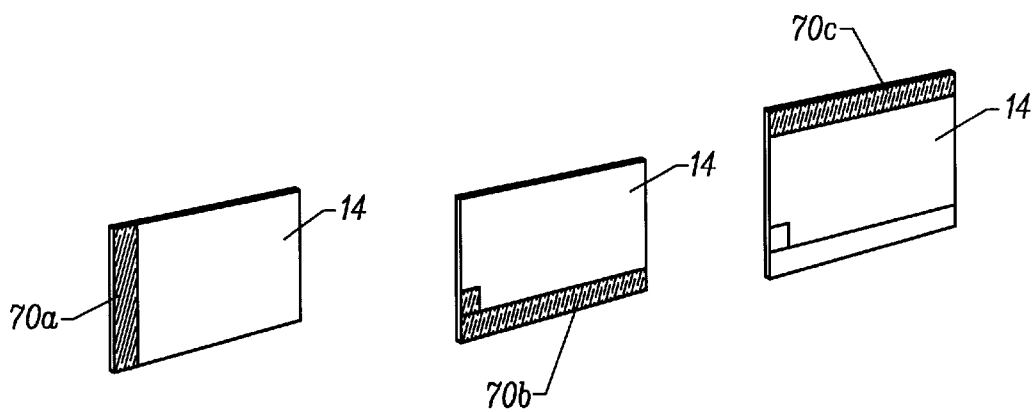
FIGS. 7a–7c show alternative embodiments of the invention that provide side, bottom, and top mounting configurations for fitting a sensor array to a writing surface.

FIGS. 7a–7c show alternative embodiments of the invention that provide side, bottom, and top mounting configurations for fitting a mobile unitary sensor array to a writing surface. FIG. 7a shows a writing surface 14 having a sensor array 70a affixed to a side thereof; FIG. 7b shows a writing surface 14 having a sensor array 70b affixed to a bottom thereof (and which may therefore also serve as a tray to hold various writing implements); and FIG. 7c shows a writing surface 14 having a sensor array 70c affixed to a top thereof.

It can be seen from FIGS. 2–7 that the invention provides a variety of configurations that allow a mobile unitary sensor array to be fitted to any substantially planar writing surface. Thus, the sensor array may be manufactured such that the individual sensors are all contained within a standard, unitary package and may be alternatively configured for attachment as shown in the figures by providing a variety of adapters and/or fasteners. It is important to note that the accuracy of the sensor array is assured by calibrating the sensors during manufacture and within a common enclosure. Thus, the relationship of the sensors is determined during manufacture of the sensor array. As such, the sensor array is readily retrofitted to any substantially planar surface by a variety of mechanisms with the assurance of a highly accurate and precise determination of writing implement position. In this way, the invention avoids the need for dedicated writing surfaces, provides a truly portable and compact electronic data capture device, and further provides a data acquisition system that faithfully captures text and drawings without the need for in situ calibration and recalibration.

Although the invention is calibrated at the factory, some users may want the option of calibrating the system in the field to further define and add desired functionality. For example, the user may want to create a "dead" area on the planar surface, so that marks in this area are not forwarded to the computer. The user also may want to calibrate specific elements within the active area to create a toolbar, a video window, or other feature. In addition, user field calibration of the elements within the sensor array provides a wide range of user-defined configurations useful for portability or to work with varying sizes of planar areas. Calibration in the field may be achieved through a variety of methods, including but not limited to the following:

(1) The system may instruct the user to tap the writing or erasing instrument on the planar area at specific locations, such as upper right and lower left, and calculate the active area from these coordinates.

(2) Alternatively, the user may place transmitters at specific locations within or on the boundaries of the active area. The sensor array would detect signals from these transmitters and calculate the active area of the planar surface.

Figure 8:
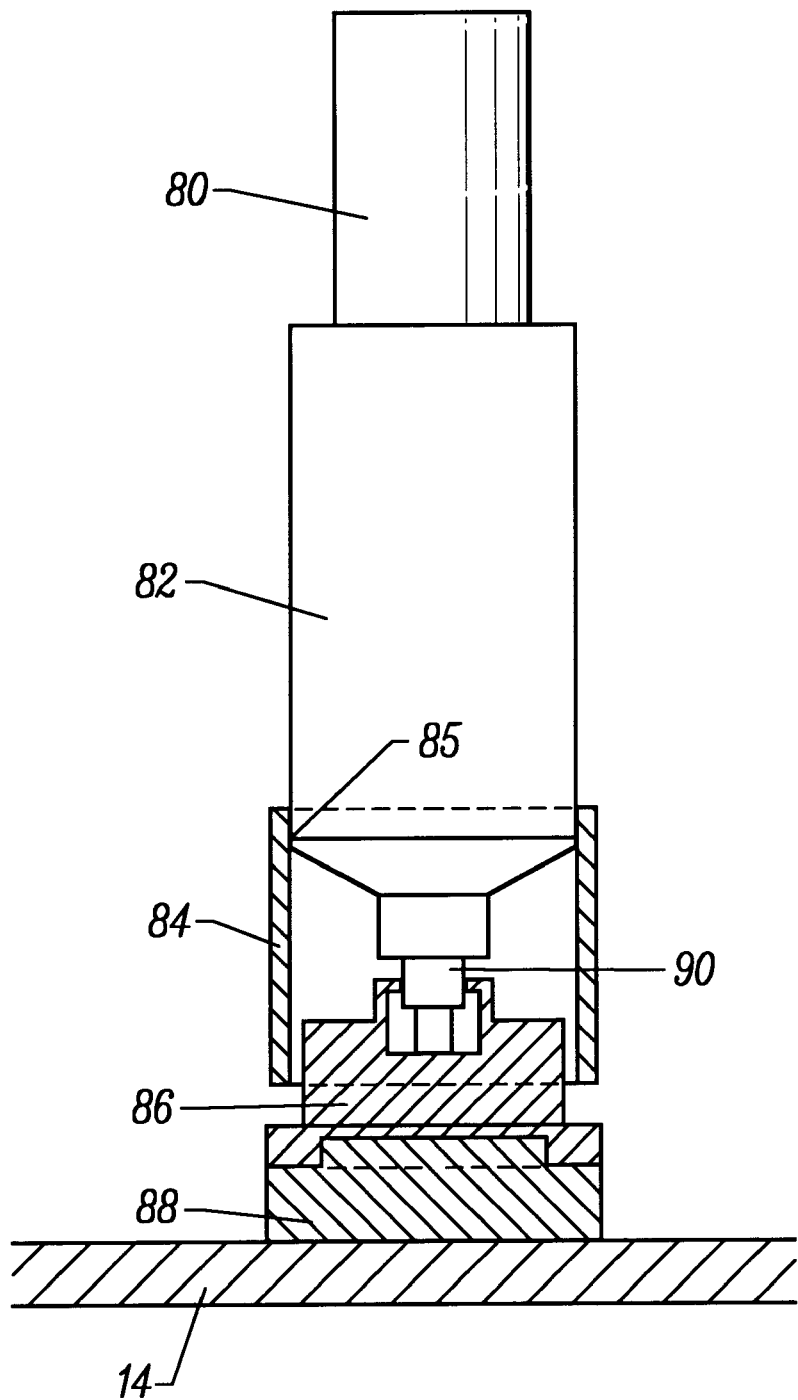
FIG. 8 is a partially sectioned, side view of a marking implement according to the invention.

Another feature of the invention is the provision of an active writing implement. FIG. 8 is a partially sectioned, side view of a marking implement according to the invention. While various multifunction writing implements have been identified above in connection with the prior art, such devices are somewhat limited in their ability to operate in connection with various tracking schemes. For example, some implements are especially designed for optical schemes, while other implements are especially designed for electromagnetic tracking schemes.

The writing implement shown on FIG. 8 provides a sleeve 82 that has an inner diameter that is adapted to receive and securely retain a standard dry-erase marker 80. Thus, the herein-disclosed marking implement uses a marker that is familiar to the user and readily available. The sleeve is tapered to follow the tapered contour of the pen and terminates with a switch 90 that detects movement of the pen tip, i.e. when the tip of the pen is placed to the writing surface. Such detection generates a signal that is communicated to the sensor array to indicate that the marking implement is now in contact with the writing surface (and not above the writing surface, as such detection would provide a false plane of information to the sensor array). Thus, the sensor array only tracks marking implement position when the marking implement is registered to the writing surface. Such signal may also communicate actual positional information, for example by providing a relay or feedback of tracking information received at the pen, such that a time-based marking implement position may be derived.

Such signal may also be modulated or digitally coded to identify a particular marking implement function or color, for example whether the marking implement is a red or blue pen, whether the marking implement is drawing a thin line or a thick line, or whether the marking implement is an eraser. In connection with this last point, the marking implement herein disclosed includes a collar 84 that is adapted to be securely fitted to the sleeve 82. The collar activates a switch 85 that indicates it is fitted to the sleeve. A plunger 86 is movably fitted within the collar. An eraser 88 is securely received within the plunger.

In operation, the eraser is pressed to the writing surface to erase marking thereon. This action pushes the plunger into the collar, thereby activating the switch 90, and thereby indicating contact of the eraser with the writing surface. The presence of the collar operates the switch 85, thereby indicating that the marking implement is performing an eraser function.

In existing electronic copyboard systems that send eraser data to a computer, the eraser has a predefined size. These systems assume that the user has erased an area at least equal to the total area of the bottom of the eraser. Thus, to erase a smaller area, the user must locate and use a smaller eraser. If the user attempts to erase a small area with only the side of the eraser, which is the natural method most users would attempt, these systems receive inaccurate data regarding the size of the area that has been erased. The two-point eraser disclosed herein solves this problem by providing users with the capability to erase a wide range of areas with a single tool.

The two-point eraser 110 (FIG. 9a–9c) consists of a rectangular or round thin shape handle 100, a thin erasing edge 102, and two transmitters 103, 104. One transmitter is attached to each end of the erasing edge, as shown in FIG. 10. To erase a thin area, the user wipes the eraser on the board 112 in a motion that is parallel to the Y axis of the eraser (FIG. 11). To erase a wide area, the user wipes the eraser in a motion that is parallel to the X axis (FIG. 12). The eraser also can be wiped in a diagonal motion to achieve any size between "thin" and "wide" (FIG. 13). Thus, the invention provides an eraser that is ergonomically designed to operate in a similar fashion to that of a standard blackboard/white-board eraser, in which the user can rapidly draw the eraser back and forth across the marking surface to erase a large portion of the marking suface, if desired, and in which the user can precisely control the movement and profile of the eraser to erase only specific portions of the marking surface. Accordingly, the herein-described invention retrofittable apparatus accurately locates the ends of the eraser by use of the two transmitters, and thus defines a continuously variable and easily controlled eraser swath.

With regard to the actual determination of the position of the marking implement, the invention is readily adapted for use with any modern locating technique, including any of those techniques discussed above in connection with the prior art. The presently preferred embodiment of the invention operates in connection with a triangulation scheme that includes a Micropower Impulse Radar (MIR) device. The MIR device is a pulsed radar similar to other ultra-wideband radars, but it emits much shorter pulses than most radars and, because it is built out of a small number of common electronic components, it is compact and inexpensive. MIR devices are used in such applications as automobile back-up systems and in hand-held tools for finding studs and other objects behind walls.

One feature of MIR devices is the pulse generation circuitry. Each pulse is less than a billionth of a second and each MIR device emits about two million of these pulses per second. Actual pulse repetition rates are coded with random noise to reduce the possibility of interference from other radars, while each MIR device is tuned to itself. The same pulse is used for transmitting to send via the transmit as for sampling the received signal. Three direct advantages of the short pulse-width are:

The MIR operates across a wider band of frequencies than a conventional radar, giving high resolution and accuracy, but also making it less susceptible to interference from other radars.

There are extremely low power requirements because current is only drawn during the short pulse time and the pulses are infrequent. For example, one type of MIR unit can operate for years on a single AA battery.

The microwaves emitted by the pulse are at exceedingly low, and therefore safe, levels (microwatts). In fact, the MIR emits less than one-millionth the energy of a cellular telephone.

As with conventional radars, the antenna configuration on MIR devices determines much of its operating characteristics. Several antenna systems have been designed to match the ultra-wide frequency characteristics of the MIR sensor. For the standard MIR motion sensor with a center frequency of about 2 GHz, a small 1.5-inch antenna may be used. However, the MIR device is also flexible enough that it can operate at a relatively lower center frequency, using larger antenna systems, giving it longer range.

Averaging of many thousands of pulses is done on the MIR device to reduce the effects of noise and to increase sensitivity. A single received pulse in the nanosecond time scale may be contaminated with various forms of outside interference, but if the returns of many pulses at the same range gate are combined, the result is much more representative of the actual return. The number of averages per range gate is adjustable (nominally it is about 10,000 samples).

The exact pulse emission and detection times are randomized for at least the following reasons:

Continuous wave (CW) interference, such as from radio and TV station harmonics, may cause beat frequencies with the received echoes that can trigger false alarms. When the 10,000 samples of MIR return echoes are averaged at randomly-dithered times, random samples of CW interference are effectively averaged to zero.

Random operation also means that multiple MIR units can be collocated without interfering with each other. Channel allocations are not needed and a nearly unlimited number of sensors can be in the same vicinity even though they occupy the same wideband spectrum. This is particularly useful in a whiteboard-type application, where a plurality of sensors are used to triangulate marking implement position.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

What is claimed is:

1. A retrofittable apparatus adapted for converting a substantially planar surface into a writing surface for an electronic data capture device, comprising:
    a sensor array including two or more sensors that are mounted to establish a fixed relationship between said two or more sensors within said sensor array itself, said sensor array providing a tracking function to determine the position of a marking implement on said writing surface, said tracking function further comprising a micropower impulse radar (MIR) device, wherein said sensor array is contained within a single package; and wherein the accuracy of the sensor array is assured by calibrating said sensors within said package during manufacture; and
    an attachment method for removably affixing said unitary sensor array proximate to said substantially planar surface, said attachment method comprising any of:
        a double stick mounting tape or a temporary fastener;
        a bracket secured to a wall with a fastener;
        a first bracket having a portion that projects from a wall at an acute, upward angle, secured to the wall by a fastener; and a second bracket associated with said sensor array, said second bracket having a complementary channel that is adapted to engage with said projecting portion of said first bracket; and
        a clip-on bracket that includes a U-shaped portion which is adapted to engage with an upper edge of said writing surface.

2. The apparatus of claim 1, said sensor array further comprising:
    an L-shaped sensor array.

3. The apparatus of claim 2, wherein said sensor array is formed in an L-shaped configuration to allow three intersecting sensor paths to provide a high degree of accuracy by allowing precise triangulation of writing implement position.

4. The apparatus of claim 1, wherein said sensor array is adapted to be mounted relative to a top portion of said writing surface.

5. The apparatus of claim 1, wherein said sensor array is adapted to be mounted relative to a side portion of said writing surface.

6. The apparatus of claim 1, wherein said sensor array is adapted to be mounted relative to a bottom portion of said writing surface.

7. The apparatus of claim 1, further comprising:
    a marking implement, said marking implement comprising:
        a sleeve that has an inner diameter that is adapted to receive and securely retain a standard marker; and
        a first switch that detects movement of a marker tip to generate a signal that is communicated to the sensor array to indicate that said marking implement is in contact with said writing surface.

8. The apparatus of claim 7, wherein said signal may be modulated to identify a particular marking implement or color.

9. The apparatus of claim 7, further comprising:
    a collar that is adapted to be securely fitted to said sleeve, wherein said collar activates a second switch that indicates the collar is fitted to the sleeve.

10. The apparatus of claim 9, further comprising:
    a plunger that is movably fitted within said collar; and
    an eraser that is securely received within said plunger.

11. The apparatus of claim 10, wherein the presence of said collar operates said second switch, thereby indicating that said marking implement is performing an eraser function.

12. The apparatus of claim 1 wherein said marking implement is tapped or touched to said writing surface during a field calibration sequence at specific locations of said writing surface to establish coordinates from which an active portion of said writing surface may be calculated.

13. The apparatus of claim 1, wherein the active area of said writing surface is determined by detecting with said sensor array specific locations within or on the boundaries of the writing surface, where said specific locations are identified by transmitters located at said locations.

14. The apparatus of claim 7, wherein said signal is digitally coded to identify a particular marking implement function.

15. The apparatus of claim 7, wherein said signal is digitally coded to identify a particular marking implement color.

16. The apparatus of claim 7, wherein said signal is modulated to identify a particular marking implement function.

* * * * *